May 5, 1970  J. R. A. LESLIE  3,510,762
ELECTRICAL CABLE TEMPERATURE MONITORING AND HOT-SPOT
LOCATING SYSTEM AND METHOD UTILIZING A TRANSMISSION
LINE HAVING A LIQUID DIELECTRIC
Filed April 14, 1967

INVENTOR
JOHN R. A. LESLIE
BY
*Maybee & Legris*
ATTORNEYS

United States Patent Office 3,510,762
Patented May 5, 1970

3,510,762
ELECTRICAL CABLE TEMPERATURE MONITOR-ING AND HOT-SPOT LOCATING SYSTEM AND METHOD UTILIZING A TRANSMISSION LINE HAVING A LIQUID DIELECTRIC
John Robert Alexander Leslie, R.R. 1,
Kleinburg, Ontario, Canada
Filed Apr. 14, 1967, Ser. No. 630,880
Int. Cl. G01r *31/11;* G08b *21/00;* H02g *15/28*
U.S. Cl. 324—52                                  9 Claims

ABSTRACT OF THE DISCLOSURE

In order to determine the location of a hot-spot, that is to say a localised heated region, in a power cable, a high frequency monitoring cable is laid alongside the power cable so that it is in heat exchange relation with the power cable sheath. The monitoring cable includes a liquid dielectric having a boiling point near the limiting temperature of the cable insulation, and a dielectric constant which changes substantially when it vaporises. The monitoring cable is terminated by its characteristic impedance. If the power cable develops a hot-spot, the liquid dielectric in the vicinity of the hot-spot undergoes a change of state, i.e. vaporises, at least partly, and hence the characteristic impedance of the monitoring cable in that vicinity changes giving rise to an electrical discontinuity in the cable whose position can be readily determined by standard pulse echo or standing wave techniques. The monitoring cable may contain a solid dielectric instead of a liquid dielectric. Such a monitoring may also be used for monitoring temperatures over extended areas or distances in pipes, refineries, plants and apparatus.

BACKGROUND OF THE INVENTION

Field of the invention

This invention relates to temperature monitoring systems, and is applicable generally to means for determining the position of a remote over-heated region in an installation. Such an installation may be any plant, apparatus or conduit having regions which may become overheated and which are not readily accessible.

In one form the invention relates to means for detecting and locating a localised heated region or hot-spot in a power cable. Such a heated region may be caused by increased heat dissipation in the cable, or by increased thermal resistivity of the material surrounding the cable, or by heat sources external to the cable. High voltage power cables are frequently laid underground, and are therefore not readily accessible; consequently a hot-spot if it should develop is difficult to detect and even more difficult to locate. In the event of a fault developing which is attributable to overheating of the cable, it is usually necessary to perform extensive excavations in order to expose a considerable length of cable for examination.

Description of the prior art

Attempts have previously been made to develop liquid-filled tube monitoring systems employing a pressure detector for measuring the increase in pressure when boiling of the liquid takes place as a result of heating. Such temperature alarm systems are limited in practice to lengths less than about fifty feet, because of expansion and contraction of the tubing itself which would tend to mask pressure changes.

SUMMARY OF THE INVENTION

The present invention provides a system for monitoring temperature in an installation whereby any overheated region may be readily detected and located notwithstanding that that region remains difficult of access.

According to the invention, a temperature monitoring system for determining the position of a remote over-heated region in an installation comprises a high frequency monitoring cable (that is to say a high frequency transmission line, such as a communications cable) extending through the installation, the monitoring cable having a dielectric whose dielectric constant changes substantially at a predetermined temperature by reason of a change of state of the dielectric, so that heat generated at any overheated region through which the monitoring cable extends will cause the dielectric constant of the dielectric at that region to change substantially, and means for applying a monitoring signal to one end of the monitoring cable, whereby to determine electrically the distance along the length of the monitoring cable of the overheated region from said one end.

In one system according to the invention, heat generated at a hot-spot in a power cable is utilised to change abruptly, by means of a change of state of the dielectric, the electrical characteristics locally in a high frequency monitoring cable laid alongside or combined with the power cable and disposed in heat exchange relation with it. When the electrical characteristics are modified locally in the monitoring cable, the latter acquires an electrical discontinuity whose position can be readily determined by standard electrical methods. The high frequency monitoring cable contains in part a liquid or solid dielectric whose dielectric constant changes substantially, by reason of a change of state of the dielectric, at a temperature near to the limiting temperature of the power cable insulation. The limiting temperature is either the maximum permissible temperature of the insulation, or a temperature chosen arbitrarily below the maximum permissible temperature.

Preferably the dielectric is a liquid having a boiling point near the limiting temperature and a dielectric constant which is considerably higher than that of the vaporised liquid. In such a case the liquid dielectric in the vicinity of a hot-spot is vaporised by the heat generated, and so the dielectric in that vicinity becomes a mixture of the liquid and its vapour, whose effective dielectric constant is considerably reduced. In practice, liquids having dielectric constants of 30 or more are available. In the gaseous state the dielectric constant is almost invariably close to unity. An electrical discontinuity, taking the form of a substantial change in the characteristic impedance of the monitoring cable at a definite position, is produced, and this is located by applying a suitable electrical signal to one end of the monitoring cable, the signal being reflected from the discontinuity.

One convenient additional property of a liquid dielectric is that its boiling point is a function of pressure, and hence the boiling point may be easily adjusted by varying the pressure of the dielectric within the cable to match the limiting temperature of the power cable sheath. In addition, mixtures of liquids may be employed to obtain more suitable electrical and thermal constants.

BRIEF DESCRIPTION OF THE DRAWINGS

Embodiments of the invention will now be described by way of example with reference to the accompanying drawings, in which.

DESCRIPTION OF THE PREFERRED EMBODIMENTS

Figure 1:
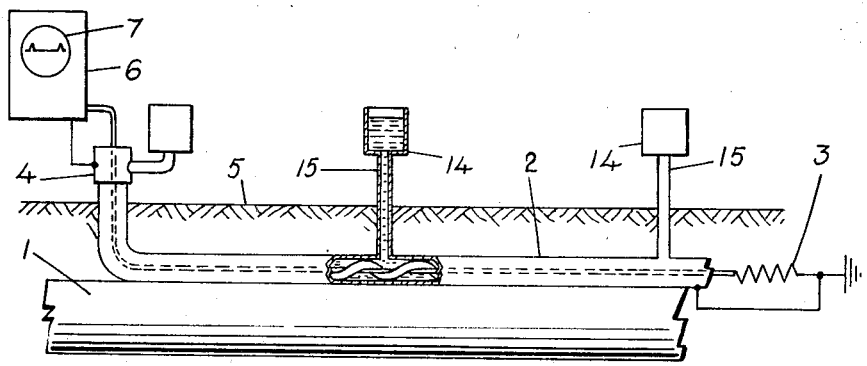
FIG. 1 is a diagrammatic, part-sectional, elevation of a subterranean high voltage power cable in combination with a monitoring system for detecting and locating hot-spots in the cable.

FIG. 1 shows a subterranean high voltage power cable 1 having a sheath, in combination with monitoring means for detecting and locating any hot-spots that might develop in the cable under fault conditions. The monitoring means comprises a high frequency cable 2 laid along the power cable 1 and disposed in heat exchange relation with it. The cable 2 is terminated at one end by a resistor 3, which is of the characteristic impedance of the cable, and the other end 4 of the cable is brought out above ground level 5 and connected to a monitoring device 6 for applying monitoring signals to the cable. In the illustrated embodiment the monitoring device 6 is a time domain reflectometer (which may be of the type known as Hewlett-Packard Type 1415A) for generating high frequency electrical pulses, the pulses are fed into the cable 2, and any pulses reflected from the cable are received and detected by the reflectometer. On the screen of a cathode ray tube 7 of the reflectometer there is presented a display consisting of a first blip corresponding to a generated or transmitted pulse and a second blip corresponding to a reflected pulse, if any, the distance between the blips being a measure of the time interval between transmission of a generated pulse and reception of a reflected pulse, and hence a measure of the distance from the end 4 of the cable of any reflecting region or electrical discontinuity of the cable. Preferably the reflectometer incorporates detector and alarm means which are responsive to received signals only for producing an alarm signal indicative of an electrical discontinuity in the monitoring cable 2.

Figure 2:
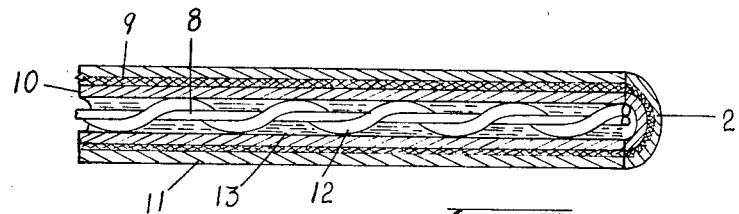
FIG. 2 is a fragmentary longitudinal of a monitoring cable used in the monitoring system of FIG. 1.

The cable 2, a section of which is illustrated in greater detail in FIG. 2, is a coaxial cable comprising an inner conductor 8 and an outer conductor 9, the conductor 9 being braided and laid upon the outer surface of an electrically insulating tube 10 of plastics material, such as Teflon. The cable is protected by a bituminous or plastic sheath 11. The inner conductor 8 lies along the axis of the cable and is spaced from the tube 10 by means of a spacer 12, which takes the form of a thread of Teflon wound helically upon the inner conductor. The tube 10 serves as a container for a liquid dielectric 13, which fills the space between the inner conductor and the tube 10. The liquid dielectric is one which has a boiling point near the limiting temperature of the power cable sheath, that is to say, the maximum permissible temperature of the sheath. Also the dielectric is chosen to have a dielectric constant which changes substantially when it vaporises. There are many liquids which serve the twin requirements of having a suitable dielectric constant and a suitable boiling point, and chlorethane having a boiling point of approximately 74° C. is suitable for the purpose. Many alcohols and halogenated hydrocarbons such as 111-trichlorethane and 12 dichlorethane are also suitable. Mixtures of liquids may also be utilized, the liquids being selected in order to obtain certain electrical and thermal constants. In certain applications a solid dielectric may be preferred, especially if the monitoring cable is to be arranged vertically or at an inclination to the horizontal.

The cable 2 may be combined with the cable 1 or may be a separate cable laid alongside the power cable in thermal contact with it, the essential requirement being that the liquid dielectric attains a temperature close to that of the power cable.

Spaced at intervals along the length of the cable 2 are headers 14 containing the liquid dielectric, the headers being situated above ground level and connected to the cable 2 by pipes 15. The arrangement of the headers facilitates filling of the cable with the dielectric, and accommodates any expansion of the dielectric. Furthermore, by selecting the level of the liquid dielectric in the headers the pressure of the liquid can be adjusted whereby to adjust the boiling point of the liquid.

In operation of the system, under normal conditions the reflectometer transmits periodic pulses, the power of which is wholly absorbed by the cable 2 and the resistor 3, there being substantially no reflection of energy. If the power cable develops a hot-spot so that there is local overheating of its sheath at any position, the heat generated is conducted to the liquid dielectric of the cable 2, which is heated locally to undergo a change of state and bubbles of vapour are formed. Since the dielectric constant of the vaporised liquid is very much less than that of the unvaporised liquid, being close to unity, the electrical characteristics of the cable 2 in that locality change, abruptly and substantially, thus providing an electrical discontinuity from which the transmitted pulses are reflected back to the reflectometer. The reflected pulses when received actuate an alarm device in the reflectometer, indicating to an attendant that there is a fault condition. By measuring the time interval between the transmitted and reflected pulses, as shown by the display 7, the distance of the electrical discontinuity from the end of the cable 2, and hence the exact position of the region of overheating, or hot-spot can be determined from the formula $$t = 2L/v$$

where L is the distance of the discontinuity from the cable end, $t$ is the time interval between the transmitted and received pulses, and $v$ is the velocity at which electrical pulses are transmitted along the cable.

Figure 3:
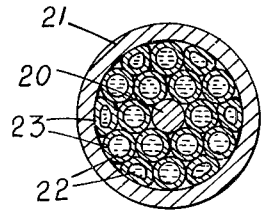
FIGS. 3 and 4 are cross-sectional views of two modified constructions of monitoring cable which may be used in the monitoring system of FIG. 1.

FIG. 3 illustrates a modified construction of monitoring cable 2 having coaxial inner and outer conductors 20 and 21. In this construction the liquid dielectric 22 is contained in plastic tubes 23, which extend longitudinally of the cable and act as spacer means between the conductors. Other forms of spacer, such as star-shaped plastic fins, are also envisaged.

Figure 4:
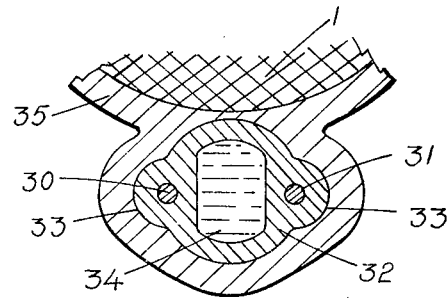

FIG. 4 illustrates another construction of monitoring cable comprising twin conductors 30 and 31, which are embedded in the wall of a plastic tube 32, which may be of Teflon. The tube 32 is formed with two diametrically opposed thickened ribs 33, in which the conductors 30 and 31 are embedded, and is filled with a suitable dielectric 34 which lies between the conductors. As illustrated in FIG. 4, the monitoring cable is combined with the power cable 1 by being enclosed within the protective sheath 35 of the latter.

With both of the constructions shown in FIGS. 3 and 4, the monitoring cable is disposed along the power cable in the manner described with reference to FIG. 1, and heat generated at a hot-spot causes local vaporisation of the liquid dielectric with a consequent change of its dielectric constant.

Figure 5:
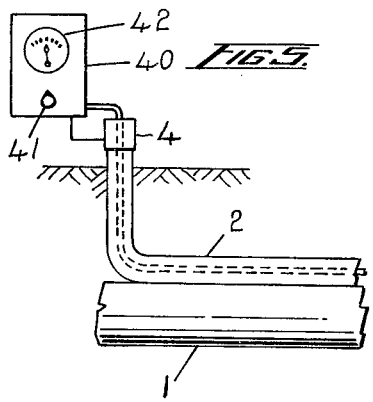
FIG. 5 illustrates the use of an alternative monitoring device, namely a variable frequency oscillator, applied to the system of FIG. 1.
Figure 5A:
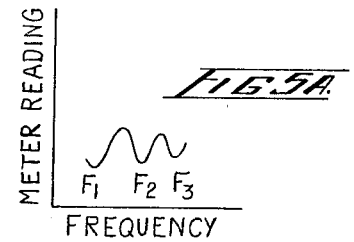
FIG. 5A is an explanatory diagram to be read in conjunction with FIG. 5.

Instead of using a pulse echo technique for determining the position of an electrical discontinuity in the monitoring cable, the well known standing wave method may be used. As shown in FIG. 5, a variable frequency oscillator 40 having a tuning knob 41 and a meter 42 is connected to the input end 4 of the monitoring cable 2. The meter reading is an indication of the magnitude of a parameter, such as the anode current of the oscillator tube, which is directly related to the load on the oscillator. If the monitoring cable has an electrical discontinuity, that is to say a region from which input signals are reflected, then the meter reading will be a function of frequency as illustrated diagrammatically in FIG. 5A. It will be obvious that the frequencies $f_1$, $f_2$, $f_3$ etc. at which the maxima occur are such that the following relations hold $$f_3 - f_2 = f_2 - f_1 = \frac{2v}{L}$$

from which the distance L can readily be determined.

Although the invention has been particularly described with reference to temperature monitoring systems for high voltage power cable, it is readily applicable to temperature monitoring systems for other installations in which it is required to detect and locate overheated regions in remote or inaccessible positions. Such installations may include refineries, manufacturing plants, laid pipes and conduits, and electrical apparatus such as oil-cooled transformers and large dynamoelectric machines.

What I claim as my invention is:

1. A temperature monitoring system for determining the position of a remote overheated region in an installation, comprising:

a high frequency transmission line extending through the installation, the transmission line having a characteristic impedance, the transmission line including a dielectric whose dielectric constant changes abruptly at a predetermined temperature by reason of a change of state of the dielectric, so that heat generated at any overheated region through which the transmission line extends will cause the dielectric constant of the dielectric at that region to change abruptly thus producing a discontinuity in the electrical characteristics of the line at that region; and distance measuring means connected to one end of the transmission line, said distance measuring means comprising means for applying a monitoring signal to said one end of the transmission line which signal will be reflected from said discontinuity, and means for detecting the reflected signal whereby to determine the distance along the length of the transmission line of said discontinuity from said one end.

2. A method of detecting and locating the position of a hot-spot in a power cable having a protective insulation, which method comprises:

providing a high frequency transmission line having a characteristic impedance and containing a liquid dielectric having a boiling point near the limiting temperature of the cable insulation;

laying the transmission line along the power cable in heat exchange relationship with the power cable so that the dielectric in the region of a hot-spot will be vaporised by heat generated at the hot-spot, thereby producing a discontinuity in the electrical characteristics of the transmission line at that region;

applying a monitoring signal to one end of the transmission line, such signal being reflected from said discontinuity; and detecting the reflected signal whereby to determine the distance along the length of the transmission line of the discontinuity from said one end.

3. In combination with a power cable having an insulating sheath, a high frequency transmission line having a characteristic impedance, the transmission line including a dielectric whose dielectric constant changes abruptly at a predetermined tempearture by reason of a change of state of the dielectric, which temperature is the limiting temperature of the cable sheath, and means connecting the transmission line to the power cable, the transmission line being connected to lie along the length of the power cable in heat exchange relationship therewith so that heat generated at any hot-spot in the power cable will cause the dielectric constant of the dielectric in the locality of the hot-spot to change abruptly thus producing a discontinuity in the electrical characteristics of the transmission line at that locality, whereby the distance of said locality from one end of the cable may be determined electrically.

4. The combination claimed in claim 3, wherein the dielectric is a liquid having a boiling point near the limiting temperature of the power cable sheath.

5. The combination claimed in claim 4, wherein the liquid dielectric is an alcohol.

6. The combination claimed in claim 4, wherein the liquid dielectric is a halogenated hydrocarbon.

7. The combination claimed in claim 4, wherein the high frequency transmission line comprises coaxial inner and outer conductors separated by non-conducting spacer means, the liquid dielectric being contained within and filling the space between the conductors.

8. The combination claimed in claim 4, wherein the high frequency transmission line comprises coaxial inner and outer conductors and a plurality of tubes of insulating material extending along the length of the transmission line and acting as spacer means between the conductors, the tubes containing the liquid dielectric.

9. The combination claimed in claim 4, wherein the high frequency transmission line comprises a pair of parallel, twin conductors, a tube of insulating material, the tube containing the liquid dielectric, and the conductors being embedded in the wall of the tube with the liquid dielectric lying between them.

References Cited

UNITED STATES PATENTS

| | | | |
|---|---|---|---|
| 2,686,215 | 8/1954 | Fondiller | 174—11 XR |
| 2,758,294 | 8/1956 | Duncan | 338—26 XR |
| 2,759,172 | 8/1956 | Lindberg | 340—227 |
| 2,802,924 | 8/1957 | Hebenstreit | 338—26 |
| 2,863,975 | 12/1958 | Hebenstreit | 338—26 |
| 3,031,643 | 4/1962 | Sheftelman | 324—52 XR |
| 3,089,339 | 5/1963 | Rogers et al. | 338—26 XR |
| 3,187,080 | 6/1965 | Ball | 174—11 |
| 3,347,098 | 10/1967 | Bielstein et al. | 174—11 XR |
| 3,365,661 | 1/1968 | Zimmerman | 324—52 |

FOREIGN PATENTS

| | | |
|---|---|---|
| 723,458 | 2/1955 | Great Britain. |

OTHER REFERENCES

Fault Locator, Electrical World, Dec. 9, 1963, pp. 34, 324-52.

GERARD R. STRECKER, Primary Examiner

U.S. Cl. X.R.

73—342; 174—11; 340—227